US012598649B2

(12) United States Patent
Wilhelmsson et al.

(10) Patent No.: US 12,598,649 B2
(45) Date of Patent: Apr. 7, 2026

(54) SENSING COORDINATION

(71) Applicant: Telefonaktiebolaget LM Ericsson (publ), Stockholm (SE)

(72) Inventors: Leif Wilhelmsson, Lund (SE); Miguel Lopez, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 296 days.

(21) Appl. No.: 18/261,309

(22) PCT Filed: Jan. 25, 2021

(86) PCT No.: PCT/EP2021/051604
§ 371 (c)(1),
(2) Date: Jul. 13, 2023

(87) PCT Pub. No.: WO2022/156909
PCT Pub. Date: Jul. 28, 2022

(65) Prior Publication Data
US 2024/0080892 A1 Mar. 7, 2024

(51) Int. Cl.
*H04W 84/12* (2009.01)
*H04W 72/12* (2023.01)
(Continued)

(52) U.S. Cl.
CPC ....... *H04W 74/0816* (2013.01); *H04W 72/12* (2013.01); *H04W 74/04* (2013.01)

(58) Field of Classification Search
CPC ....... H04W 4/02; H04W 24/10; H04W 72/29; H04W 84/12; H04W 72/12
(Continued)

(56) References Cited

U.S. PATENT DOCUMENTS 7,133,432 B2 * 11/2006 Kuffner .................. H04W 16/14
370/335
8,467,996 B2 * 6/2013 Perez .................... G01J 3/0264
702/70
(Continued)

OTHER PUBLICATIONS

Allegue, Michel , et al., "Wi-Fi Sensing: Technical Feasibility, Standardization Gaps", IEEE 802.11-17/1850r0, Nov. 2019, 27 pages.
(Continued)

*Primary Examiner* — John Pezzlo
(74) *Attorney, Agent, or Firm* — Murphy, Bilak & Homiller, PLLC

(57) ABSTRACT

A method is disclosed for a sensing correction device. The sensing coordination device is associated with one or more sensing receiver devices and a radio access node configured for communication with one or more wireless communication devices. The method comprises selecting at least one of the sensing receiver devices in association with a time interval, instructing the selected sensing receiver devices to perform sensing measurements during the time interval, and causing transmission (during the time interval) of a communication packet between the radio access node and at least one of the wireless communication devices which differs from the selected at least one sensing receiver device. A method is also disclosed for a sensing receiver device. The method comprises receiving, from a sensing coordination device, an instruction to perform sensing measurements during a time interval, and performing sensing measurements, during the time interval, on a communication packet transmitted between a radio access node and at least one wireless communication device which differs from the sensing receiver device. Corresponding apparatuses, sensing coordination device, sensing receiver device, and computer program product are also disclosed.

20 Claims, 6 Drawing Sheets

(51) Int. Cl.
　　*H04W 74/04*　　　　(2009.01)
　　*H04W 74/0816*　　　(2024.01)
　　*H04W 24/10*　　　　(2009.01)

(58) Field of Classification Search
　　USPC ........................................ 370/252, 329, 338
　　See application file for complete search history.

(56)　　　　　　　References Cited

U.S. PATENT DOCUMENTS

| | | | | |
|---|---|---|---|---|
| 10,338,191 | B2 * | 7/2019 | Baxley ..................... | H04B 1/18 |
| 2018/0167772 | A1 * | 6/2018 | Bennett ................. | H04W 16/28 |
| 2019/0364433 | A1 * | 11/2019 | Das ......................... | G06N 5/045 |
| 2020/0151554 | A1 * | 5/2020 | Siraj ..................... | H04W 16/22 |
| 2022/0070710 | A1 * | 3/2022 | Lim ....................... | H04W 72/04 |
| 2022/0232626 | A1 * | 7/2022 | Li .......................... | H04W 72/02 |
| 2023/0189382 | A1 * | 6/2023 | Haustein .............. | H04W 76/20 |
| | | | | 370/329 |

| | | | | |
|---|---|---|---|---|
| 2024/0049161 | A1 * | 2/2024 | Katla .................... | G01S 13/003 |
| 2024/0064685 | A1 * | 2/2024 | Manolakos .......... | H04L 1/0068 |

OTHER PUBLICATIONS

Da Silva, Claudio , et al., "Presence and Proximity Detection Using WLAN Sensing", IEEE 802.11-19/1772r0, Oct. 2019, 17 pages.

Da Silva, Claudio , "Wireless LANs", IEEE 802.11-19/2103r4, CTPClassification=CTP_NT, 802.11 SENS SG Proposed PAR, Jan. 14, 2020, 4 pages.

Du, Rui , et al., "Definitions and scenarios of the WLAN sensing", IEEE 802.11-21/0035r0, Jan. 2021, 20 pages.

Jang, Insun , et al., "Discussion onWLAN Sensing Roles", IEEE 802.11-20/1805r1, Nov. 2020, 11 pages.

Kim, Sang , "Collaborative WLAN Sensing", IEEE 802.11-20/1533r0, Sep. 2020, 13 pages.

Lee, Dongjune , et al., "An Airborne Communication Relay Scheme for IEEE 802.11 WLAN based Network", IEEE, ICOIN, 2018, 6 pages.

* cited by examiner

SENSING COORDINATION

TECHNICAL FIELD

The present disclosure relates generally to the field of wireless sensing. More particularly, it relates to coordination of wireless sensing transmission and reception.

BACKGROUND

Wireless sensing can be performed by detecting changes in a wireless propagation channel. To this end, a sensing receiver device receives multiple physical layer packets transmitted by a sensing transmitter device, and performs measurements thereon. The measurements are used to detect and/or classify the occurrence of events.

Typical applications of wireless sensing include, but are not limited to, home security (e.g., intruder detection), control of home appliances (e.g., turning on/off lights in relation to resident location), health care (e.g., monitoring vital signs such as heart rate, breathing, etc.), production surveillance (e.g., monitoring machines in a factory).

Examples of sensing measurements include, but are not limited to, received signal strength indicator (RSSI) measurements, channel state information (CSI) measurements (e.g., measuring the frequency response of the propagation channel), and channel estimation measurements.

Wireless sensing may be seen as an enhancement for radio technologies that have been designed primarily for communication. For example, the IEEE 802.11 Working Group has initiated the task group 802.11bf with the purpose of developing a standard amendment to support wireless sensing.

Exemplification of scenarios, problems, solutions, and advantages will be given herein using terminology associated with IEEE 802.11. It should be noted that this is not intended as limiting, but merely as illustrative. In fact, the same—or corresponding—scenarios, problems, solutions, and/or advantages may be equally relevant for other radio technologies (e.g., as standardized by the third generation partnership project, 3GPP; examples including sixth generation, 6G, applications).

To be able to sense movements in an environment, the movements should cause variations in the propagation channel between the sensing transmitter and the sensing receiver (i.e., it is possible to sense movements in an environment when the movements cause variations in the propagation channel between the sensing transmitter and the sensing receiver). Hence, it may be cumbersome to provide sensing coverage for proper movement detection at all desired location(s). For example, if it is desired to be able to reliably detect movements over a certain (potentially large) area, it may be envisioned that there is a trade-off in the sense that—with a fixed number of sensors—the sensors may be spread out over the area to achieve coverage over a large part of the area with potentially poor reliability, or the sensors may be placed closer together to achieve improved reliability in a specific part of the area at the cost of significant reduction of coverage.

When there are high requirements on detecting movements (e.g., in many different locations; throughout a building or covering a room), it may be envisioned that a large number of sensing transmitters and/or sensing receivers is required to properly cover the different locations.

Further, when an access point (AP) is used as sensing transmitter, only movements affecting the channel path from the AP to a sensing receiver can be detected. In some approaches, two (non-AP) stations (STAs) may be allowed to act as sensing transmitter and sensing receiver, respectively. Thereby a larger number of channels will be available for sensing and movements affecting the channel path between the two STAs can also be detected, typically increasing sensing coverage and the likelihood that movements will be detected.

However, properly covering all desired locations for sensing typically requires transmission of a huge amount of physical layer packets for sensing, which is very costly in terms of radio resources.

Therefore, there is a need for alternative approaches for wireless sensing. Preferably, such approaches improve the use of radio resources for sensing (e.g., decrease the overhead due to sensing) and/or provide proper sensing coverage.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for a sensing coordination device, wherein the sensing coordination device is associated with one or more sensing receiver devices and a radio access node configured for communication with one or more wireless communication devices.

The method comprises selecting at least one of the sensing receiver devices in association with a time interval, instructing the selected sensing receiver devices to perform sensing measurements during the time interval, and causing transmission (during the time interval) of a communication packet between the radio access node and at least one of the wireless communication devices which differs from the selected at least one sensing receiver device.

In some embodiments, causing transmission of a communication packet comprises transmitting the communication packet to the least one of the wireless communication devices during the time interval, or scheduling the at least one of the wireless communication devices for transmission during the time interval, or transmitting a request-to-send, RTS, for the at least one of the wireless communication devices, or requesting reporting from the at least one of the wireless communication devices.

In some embodiments, the communication packet is a data packet, or a control packet, or a clear-to-send (CTS) or a reporting packet.

In some embodiments, instructing the selected sensing receiver devices to perform sensing measurements comprises transmitting an explicit sensing instruction message to the selected sensing receiver devices before the time interval, or transmitting a scheduling grant for the time interval to the at least one of the wireless communication devices, wherein the scheduling grant comprises an implicit sensing instruction message to the selected sensing receiver devices, or transmitting a request-to-send (RTS) for the at least one of the wireless communication devices, wherein the RTS comprises an implicit sensing instruction message to the selected sensing receiver devices.

In some embodiments, the explicit sensing instruction message is a single instruction message indicative of a plurality of time intervals for sensing measurements.

In some embodiments, instructing the selected sensing receiver devices to perform sensing measurements during the time interval further comprises indicating a frequency interval for the sensing measurements.

In some embodiments, the at least one of the wireless communication devices comprises a plurality of the wireless communication devices and the communication packet is an orthogonal frequency division multiplexing (OFDM) packet, a preamble of the OFDM packet being common for the plurality of wireless communication devices and each wireless communication device of the plurality being associated with a respective frequency interval for the data part of the OFDM packet.

In some embodiments, selecting the at least one of the sensing receiver devices is based on locations of the sensing receiver devices in relation to a location of interest for sensing.

In some embodiments, the method further comprises selecting the at least one of the wireless communication devices based on locations of the wireless communication devices in relation to a location of interest for sensing and in relation to locations of the selected sensing receiver devices.

A second aspect is a method for a sensing receiver device. The method comprises receiving (from a sensing coordination device) an instruction to perform sensing measurements during a time interval, and performing sensing measurements (during the time interval) on a communication packet transmitted between a radio access node and at least one wireless communication device which differs from the sensing receiver device.

In some embodiments, the method further comprises operating in accordance with a low power mode between time intervals of the plurality of time intervals.

In some embodiments, the method further comprises sending a report indicative of a result of the sensing measurements.

In some embodiments, wherein the at least one wireless communication device comprises a plurality of the wireless communication devices and the communication packet is an OFDM packet, wherein a preamble of the OFDM packet is common for the plurality of wireless communication devices and each wireless communication device of the plurality is associated with a respective frequency interval for the data part of the OFDM packet, sensing measurements may be performed on the preamble to sense a composite channel associated with a combination of the frequency intervals and/or on one or more of the respective frequency intervals for the data part to sense one or more individual channels associated with corresponding ones of the frequency intervals.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for a sensing coordination device, wherein the sensing coordination device is configured to be associated with one or more sensing receiver devices and a radio access node configured for communication with one or more wireless communication devices.

The apparatus comprises controlling circuitry configured to cause selection of at least one of the sensing receiver devices in association with a time interval, instruction of the selected sensing receiver devices to perform sensing measurements during the time interval, and transmission, during the time interval, of a communication packet between the radio access node and at least one of the wireless communication devices which differs from the selected at least one sensing receiver device.

A fifth aspect is a sensing coordination device comprising the apparatus of the fourth aspect.

A sixth aspect is an apparatus for a sensing receiver device. The apparatus comprises controlling circuitry configured to cause reception, from a sensing coordination device, of an instruction to perform sensing measurements during a time interval, and performance of sensing measurements, during the time interval, on a communication packet transmitted between the sensing coordination device and at least one wireless communication device which differs from the sensing receiver device and is associated with the sensing coordination device.

A seventh aspect is a sensing receiver device comprising the apparatus of the sixth aspect.

In some embodiments, any of the above aspects may additionally have features identical with or corresponding to any of the various features as explained above for any of the other aspects.

An advantage of some embodiments is that alternative approaches for wireless sensing are provided.

An advantage of some embodiments is that the use of radio resources for sensing is improved.

For example, the overhead due to sensing may be decreased. Such overhead may relate to physical layer packets transmitted for no other purpose than sensing.

An advantage of some embodiments is that proper sensing coverage is enabled. For example, the sensing coverage may be increased according to some embodiments.

An advantage of some embodiments is that power consumption for sensing receiver(s) may be decreased.

BRIEF DESCRIPTION OF THE DRAWINGS

Further objects, features, and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where alternative approaches for wireless sensing are provided. Some embodiments improve the use of radio resources for sensing (e.g., decrease the overhead due to sensing) and/or provide proper sensing coverage. Alternatively or additionally, some embodiments enable decreased power consumption for sensing receiver(s).

Generally, when overhead is mentioned herein, it is meant to include any applicable overhead including (but not limited to) signaling overhead such as radio resource utilization.

Generally, when an access point (AP) is referred to herein, it should be understood that any features and/or effects described as relating to the AP are equally applicable in relation to any other radio access node (e.g., a base station, BS; for example configured to operate in compliance with a suitable 3GPP standard, such as a 6G standard).

Also generally, when a station (STA) is referred to herein, is should be understood that any features and/or effects described as relating to the STA are equally applicable in relation to any other wireless device (e.g., a user equipment, UE; for example configured to operate in compliance with a suitable 3GPP standard, such as a 6G standard).

Figure 1:
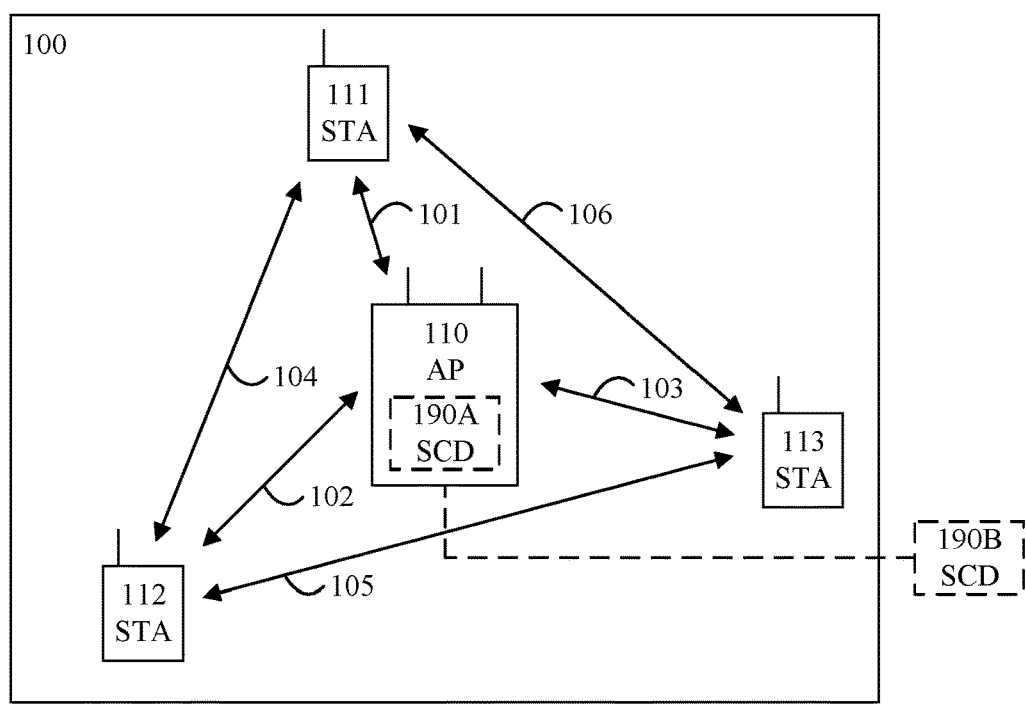
FIG. 1 is a schematic drawing illustrating an example scenario according to some embodiments.

FIG. 1 schematically illustrates an example scenario where sensing approaches according to some embodiments may be applicable.

The scenario of FIG. 1 relates to an environment 100 (e.g., a room), which is to be partly or fully covered by wireless sensing. Within the environment 100, there is located an access point (AP) 110 and one or more stations (STA) 111, 112, 113.

A station 111, 112, 113 may be a wireless communication device; e.g., configured for wireless communication with the access point 110 via respective radio channel as illustrated by 101, 102, 103.

Alternatively or additionally a station 111, 112, 113 may be a sensing receiver device. Thus, when the AP acts as a sensing transmitter device, the station 111, 112, 113 may be configured to perform sensing measurements in relation to a radio channel between the AP and the station 111, 112, 113 as illustrated by 101, 102, 103. Alternatively or additionally, when another station 111, 112, 113 acts as sensing transmitter device, the station 111, 112, 113 may be configured to perform sensing measurements in relation to a radio channel between the sensing transmitter device station and the sensing receiver device station as illustrated by 104, 105, 106.

A sensing coordination device (SCD) 190A, 190B may be configured to perform sensing coordination. In some embodiments, sensing coordination comprises one or more of: controlling sensing transmission and/or reception, collecting sensing measurement results, and analyzing sensing measurement results.

For example, sensing coordination may comprise selecting—for one or more time intervals—which device(s) to use as sensing transmitter device(s) and/or which device(s) to use as sensing receiver device(s) within the time interval. Alternatively or additionally, sensing coordination may comprise causing the sensing transmitter device(s) to transmit one or more packets suitable for sensing during the time interval and/or instructing the sensing receiver device(s) to perform sensing measurements during the time interval.

The sensing coordination device may be comprised in the AP 110 as illustrated by SCD 190A, or may be otherwise associated with (e.g., connected to) the AP 110 as illustrated by SCD 190B. In the latter case, the SCD 190B may be comprised in one of the STAs 111, 112, 113, or in a control node (e.g., a central network node, or a server node) within or external to the environment 100. In some embodiments, the SCD 190B is implemented within a cloud architecture.

Generally, it should be noted that there are different scenarios for the SCD (the device that supports sensing). In one example, a sensing receiver device (i.e., a device configured to perform measurements used for wireless sensing) comprises the device that supports sensing. In one example, a sensing transmitter device (i.e., a device configured to transmit signals suitable for sensing measurements) comprises the device that supports sensing. In one example, the device that supports sensing is not comprised in any of the sensing receiver or transmitter devices. According to some embodiments, a packet suitable for sensing comprises a communication packet. A communication packet is defined as a packet carrying some information relevant for wireless communication (and not only relevant for sensing). Examples of communication packets include data packets, control packets, clear-to-send (CTS), reporting packets, etc. By using communication packets for sensing, the overhead due to sensing may be decreased since no (or fewer) packets that are only intended for sensing are required (e.g., sensing measurements are performed on packets that are sent any-way—regardless of the sensing).

Furthermore, according to some embodiments, a sensing receiver device may perform sensing measurements on a communication packet carrying information which is intended for communication reception by one or more other devices than the sensing receiver device (e.g., information which is not intended for communication reception by the sensing receiver device, or information which is not only intended for communication reception by the sensing receiver device). By enabling sensing measurements on communication packets intended for communication reception by other devices than the sensing receiver device, the sensing coverage may be improved. This is termed "third party sensing" herein.

For example, if there is no communication information to be transmitted between two (first and second) devices associated with a radio channel that needs to be sensed, the radio channel can be sensed using communication information transmitted from one of the two devices to another (third) device such that the transmission is also present over the radio channel that needs to be sensed; thereby providing sensing coverage while keeping the sensing overhead at a low level (e.g., reducing, or minimizing, the sensing overhead). For example, the sensing overhead may be reduced compared to using packets that are only intended for sensing.

Relating to FIG. 1, the channel 101 may be sensed by STA 111 using a communication packet transmitted by AP 110 and intended for communication reception by STA 112 and/or STA 113, for example. Alternatively or additionally, relating to FIG. 1, the channel 104 may be sensed by STA 111 using a communication packet transmitted by STA 112 and intended for communication reception by AP 110, for example.

In some embodiments, several sensing receiver devices may perform sensing measurements on the same communication packet. Thus, there may be joint sensing measurements performed by two or more sensing receiver devices using the same communication packet. This may further reduce the overhead due to sensing and/or improve sensing coverage. For example, the sensing overhead may be reduced compared to using packets that are only intended for sensing and/or compared to when a packet is used for sensing measurements by only one sensing receiver device.

Relating to FIG. 1, the channels 101 and 103 may be sensed by STAs 111 and 113, respectively, using a communication packet transmitted by AP 110 and intended for communication reception by STA 112, for example. Alternatively or additionally, relating to FIG. 1, the channels 104 and 105 may be sensed by STAs 111 and 113, respectively, using a communication packet transmitted by STA 112 and intended for communication reception by AP 110, for example.

Figure 2:
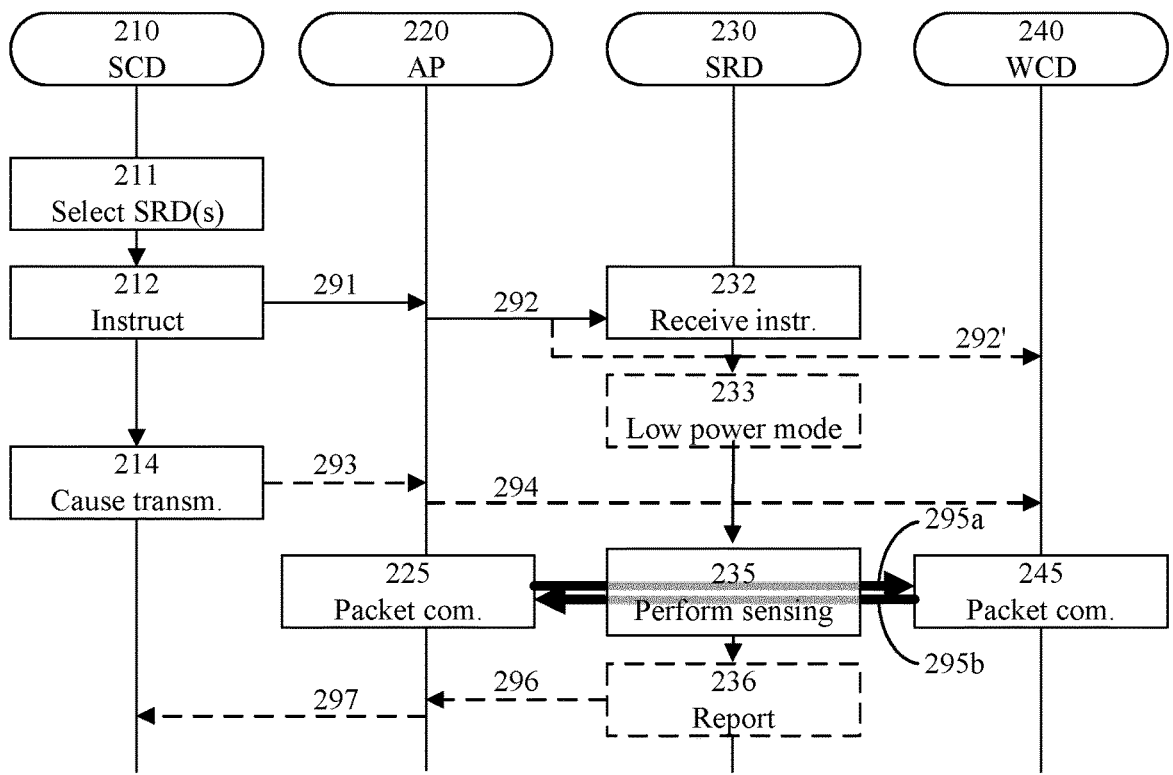
FIG. 2 is a combined flowchart and signaling diagram illustrating example method steps and signaling according to some embodiments.

FIG. 2 illustrates principles according to some embodiments, by example method steps and signaling relating to a sensing coordination device (SCD) 210, an access point (AP) 220, a sensing receiver device (SRD) 230, and a wireless communication device (WCD) 240. In this example, either of the AP 220 and the WCD 240 acts as sensing transmitter device.

The SCD 210 is associated with the AP 220 and with one or more SRDs (including the SRD 230), and the AP 220 is configured for communication with one or more WCDs (including the WCD 240).

For example, the SCD may correspond to the SCD 190B of FIG. 1, the AP 220 may correspond to the AP 110 of FIG.

1, the SRD 230 may correspond to one or more of the STAs 111, 112, 113 of FIG. 1, and the WCD 240 may correspond to one or more of the STAs 111, 112, 113 of FIG. 1.

Generally, one device (e.g., a STA) can be configured to function as only a WCD, as only an SRD, or as a WCD and an SRD. However, when executing the principles of FIG. 2, the identity of at least one of the devices represented by the WCD 240 differs from the identities of the devices represented by the SRD 230. The SRD 230 may be termed as a "sensing STA" and the WCD 240 may be termed as a "non-sensing STA" in some embodiments.

In step 211, the SCD 210 selects at least one SRD 230 in association with, or for, a time interval. When the communication packet is a downlink packet, any (one, some, or all) of the SRDs associated with the SCD 210 may be selected in step 211. When the communication packet is an uplink packet, any (one, some, or all) of the SRDs associated with the SCD 210 may be selected in step 211, with the exception of any SRD also acting as sensing transmitter device in the time interval.

In step 212, the SCD 210 instructs the selected SRD 230 to perform sensing measurements during the time interval. In FIG. 2, this is implemented by the SCD 210 sending a signal 291 to the AP 220 and, responsive thereto, the AP 220 sending an instruction signal 292 to the SRD 230. The instruction to perform sensing measurements during the time interval is received by the SRD 230 in step 232.

The instruction signal 292 may comprise one sensing instruction message per time interval for sensing measurements, or may comprise a single instruction message indicative of a plurality of time intervals for sensing measurements (e.g., in the form of a time pattern).

In some embodiments, instructing the SRD 230 to perform sensing measurements may comprise transmitting an explicit sensing instruction message 292 to the selected sensing receiver devices before the time interval. This is suitable when the communication packet is a downlink packet as well as when the communication packet is an uplink packet.

In some embodiments, instructing the SRD 230 to perform sensing measurements may comprise transmitting a scheduling grant 292 for the time interval to the at least one of the wireless communication devices, wherein the scheduling grant comprises an implicit sensing instruction message to the selected sensing receiver devices. This is suitable when the communication packet is an uplink packet.

In some embodiments, instructing the SRD 230 to perform sensing measurements may comprise transmitting a request-to-send (RTS) 292 to the at least one of the wireless communication devices, wherein the RTS comprises an implicit sensing instruction message (e.g., via an element in the medium access control, MAC, header) to the selected sensing receiver devices. This is suitable when the communication packet is an uplink packet (e.g., a CTS or a data packet) or when the communication packet is a downlink packet (e.g., a data packet following CTS).

In some embodiments, step 212 may also comprise indicating a frequency interval (e.g., a bandwidth and lowest/center/highest frequency) for the sensing measurements. The indication of the frequency interval may be explicit or implicit (e.g., indicated by a frequency interval where the instruction signal 292 is sent).

In some embodiments—although not shown in FIG. 2—information may be provided to the WCD 240 regarding that sensing will be performed in the time interval and/or which SRDs are selected. For example, such information may be provided to WCD 240 in association with step 212.

In some embodiments, in response to receiving the instruction signal 292 indicative of the time interval(s), the SRD 230 may operate in accordance with a low power mode (e.g., an idle mode, a discontinuous reception—DTX—mode, or similar) until the time interval is reached and the SRD 230 wakes up for sensing, as illustrated by optional step 233. Generally, the SRD 230 may operate in accordance with a low power mode between time intervals where sensing measurements are to be performed. For example, the instruction signal 292 may comprise an explicit sensing instruction message which is a single instruction message indicative of a plurality of time intervals for sensing measurements. This enables the SRD 230 to operate in accordance with a low power mode between time intervals of the plurality of time intervals for sensing measurements.

Alternatively or additionally, the instruction signal 292 may be transmitted in association with some other signaling that the SRD 230 has to listen to (e.g., beacons, paging signaling, or similar). This enables the SRD 230 to operate in accordance with a low power mode between such other signaling while awaiting an instruction to perform sensing measurements.

In step 214, the SCD 210 causes transmission, during the time interval, of a communication packet between the AP 220 and the WCD 240. In FIG. 2, this is implemented by the SCD 210 sending a signal 293 to the AP 220 and, responsive thereto, the AP 220 causes (e.g., triggers) the transmission of the communication packet.

As mentioned before, a communication packet is defined as a packet carrying some information relevant for wireless communication (and not only relevant for sensing). Thus, the communication packet is a packet which is not (only) intended for sensing measurements. However, the communication packet should preferably be suitable for sensing (e.g., comprise one or more parts that can be used for channel estimation).

It should be noted that there may be one or more selected SRDs 230 and one or more WCDs 240 for each communication packet and/or for each time interval, while at least one of the WCD 240 differs from the selected SRD(s) 230. Thus, the communication packet carries at least some communication information to/from at least one device which is not a selected SRD 230. In some embodiments, the communication packet may also carry communication information to a selected SRD 230.

When the communication packet is a downlink packet, it is transmitted from the AP 220 to the WCD 240. Then, the AP 220 causes the transmission by executing step 225, wherein packet communication is performed by transmitting the communication packet 295a during the time interval to the WCD 240, which receives the communication packet 295a in step 245. For example, a downlink communication packet may be one or more of: a data packet, and a control packet.

When the communication packet is an uplink packet as illustrated by 295b, it is transmitted in step 245 from the WCD 240 to the AP 220, which receives the communication packet 295b in step 225. Then, the AP 220 causes the transmission by triggering the WCD 240 to perform the transmission of step 245. The triggering is illustrated in FIG. 2 by triggering signal 294. For example, an uplink communication packet may be one or more of: a data packet, a control packet, a reporting packet, or a clear-to-send (CTS).

For example, causing the transmission of an uplink packet may comprise one or more of: scheduling the WCD 240 for transmission during the time interval (in which case the triggering signal 294 may comprise a scheduling grant and the communication packet 295b may be a data packet), transmitting a request-to-send (RTS; e.g., a multi-user RTS, MU-RTS) to the WCD 240 as the triggering signal 294 (in which case the communication packet 295b is a corresponding clear-to-send (CTS; e.g., a multi-user CTS, MU-CTS), and requesting reporting—e.g., buffer status reporting—from the WCD 240 (in which case the triggering signal 294 comprises a report request and the communication packet 295b comprises a corresponding report). The latter two examples enables an uplink transmission to be provoked even if there is no uplink data for transmission by the WCD 240. Another example of the triggering signal is a trigger frame (e.g., in accordance with IEEE 802.11).

In some embodiments, triggering the WCD 240 to perform the transmission of step 245 may be achieved by letting the instruction signal 292 for the SRD 230 also act as a triggering signal for the WCD 240 as illustrated by 292'. This is suitable, for example, when the instruction signal and the triggering signal are both scheduling grants, and when the instruction signal and the triggering signal are both RTS.

During the time interval, the SRD 230 performs sensing measurements—as illustrated by step 235—on the communication packet 295a or 295b transmitted between the AP 220 and the WCD 240 (i.e., from the AP 220 to the WCD 240, or from the WCD 240 to the AP 220).

The sensing measurements may be performed on part(s) of the communication packet that carry information to/from a device which is not the SRD 230. In some embodiments, the sensing measurements may, additionally, be performed on part(s) of the communication packet that carry information to the SRD 230.

In some embodiments, the SRD 230 reports a result of the sensing measurements, as illustrated by optional step 236 (which may include generation and/or transmission of a report indicative of the result of the sensing measurements). In FIG. 2, the reporting is represented by the SRD 230 sending a report signal 296 indicative of the result of the sensing measurements to the AP 220, which forwards the information to the SCD 210 in signaling 297.

Reporting can be made after each time interval with sensing measurement(s), or the results from several time intervals may be reported together.

Reporting can be made in request from the SCD 210 and/or the AP 220 according to some embodiments.

Figure 3:
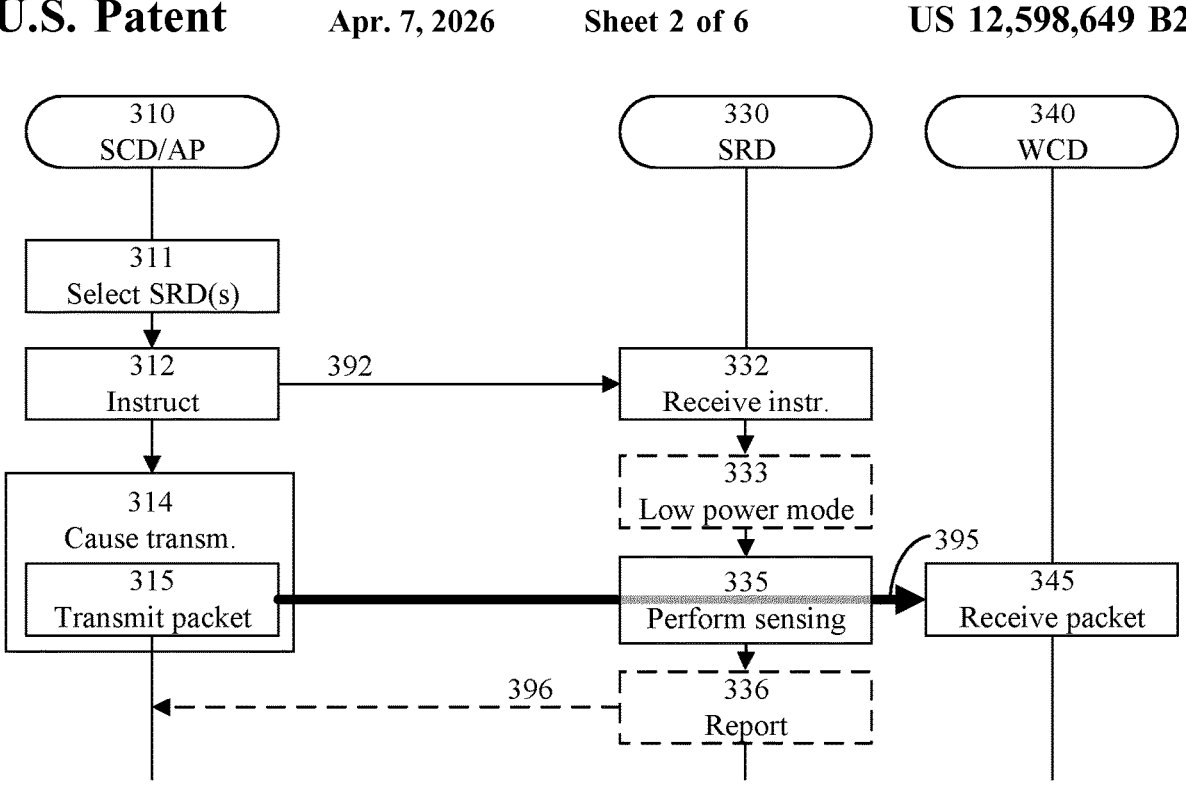
FIG. 3 is a combined flowchart and signaling diagram illustrating example method steps and signaling according to some embodiments.

FIG. 3 illustrates principles according to some embodiments, by example method steps and signaling relating to an access point (AP) 310 acting as a sensing coordination device (SCD), a sensing receiver device (SRD) 330, and a wireless communication device (WCD) 340. The example of FIG. 3 is for a downlink communication packet. In this example, the AP 310 acts as sensing transmitter device.

The AP 310 is associated with one or more SRDs (including the SRD 330), and is configured for communication with one or more WCDs (including the WCD 340).

For example, the SCD may correspond to the SCD 190A of FIG. 1, the AP 310 may correspond to the AP 110 of FIG. 1, the SRD 330 may correspond to one or more of the STAs 111, 112, 113 of FIG. 1, and the WCD 340 may correspond to one or more of the STAs 111, 112, 113 of FIG. 1.

Generally, one device (e.g., a STA) can be configured to function as only a WCD, as only an SRD, or as a WCD and an SRD. However, when executing the principles of FIG. 3, the identity of at least one of the devices represented by the WCD 340 differs from the identities of the devices represented by the SRD 330.

In step 311, the AP 310 selects at least one SRD 330 in association with (e.g., for) a time interval. Any (one, some, or all) of the SRDs associated with the AP 310 may be selected in step 311.

In step 312, the AP 310 instructs the selected SRD 330 to perform sensing measurements during the time interval. In FIG. 3, this is implemented by the AP 310 sending an instruction signal 392 to the SRD 330. The instruction to perform sensing measurements during the time interval is received by the SRD 330 in step 332.

The instruction signal 392 may comprise one sensing instruction message per time interval for sensing measurements, or may comprise a single instruction message indicative of a plurality of time intervals for sensing measurements (e.g., in the form of a time pattern).

In some embodiments, instructing the SRD 330 to perform sensing measurements may comprise transmitting an explicit sensing instruction message 392 to the selected sensing receiver devices before the time interval.

In some embodiments, instructing the SRD 330 to perform sensing measurements may comprise transmitting a request-to-send (RTS) 392 (the communication packet being a downlink data packet following CTS).

In some embodiments, in response to receiving the instruction signal 392, the SRD 330 may operate in accordance with a low power mode until the time interval is reached, as illustrated by optional step 333, and/or between time intervals when a plurality of time intervals are indicated by the instruction signal 392.

In step 314, the AP 310 causes transmission, during the time interval, of a communication packet between the AP 310 and the WCD 340. The AP 310 causes the transmission by executing substep 315, wherein packet communication is performed by transmitting the communication packet 395 during the time interval to the WCD 340, which receives the communication packet 395 in step 345. For example, the communication packet may be one or more of: a data packet, and a control packet.

During the time interval, the SRD 330 performs sensing measurements—as illustrated by step 335—on the communication packet 395 transmitted from the AP 310 to the WCD 340.

In some embodiments, the SRD 330 reports a result of the sensing measurements, as illustrated by optional step 336 (which may include generation and/or transmission of a report indicative of the result of the sensing measurements). In FIG. 3, the reporting is represented by the SRD 330 sending a report signal 396 indicative of the result of the sensing measurements to the AP 310.

It should be understood that features described in connection with FIG. 2 may be equally applicable to FIG. 3, even if not explicitly mentioned in connection thereto.

Figure 4:
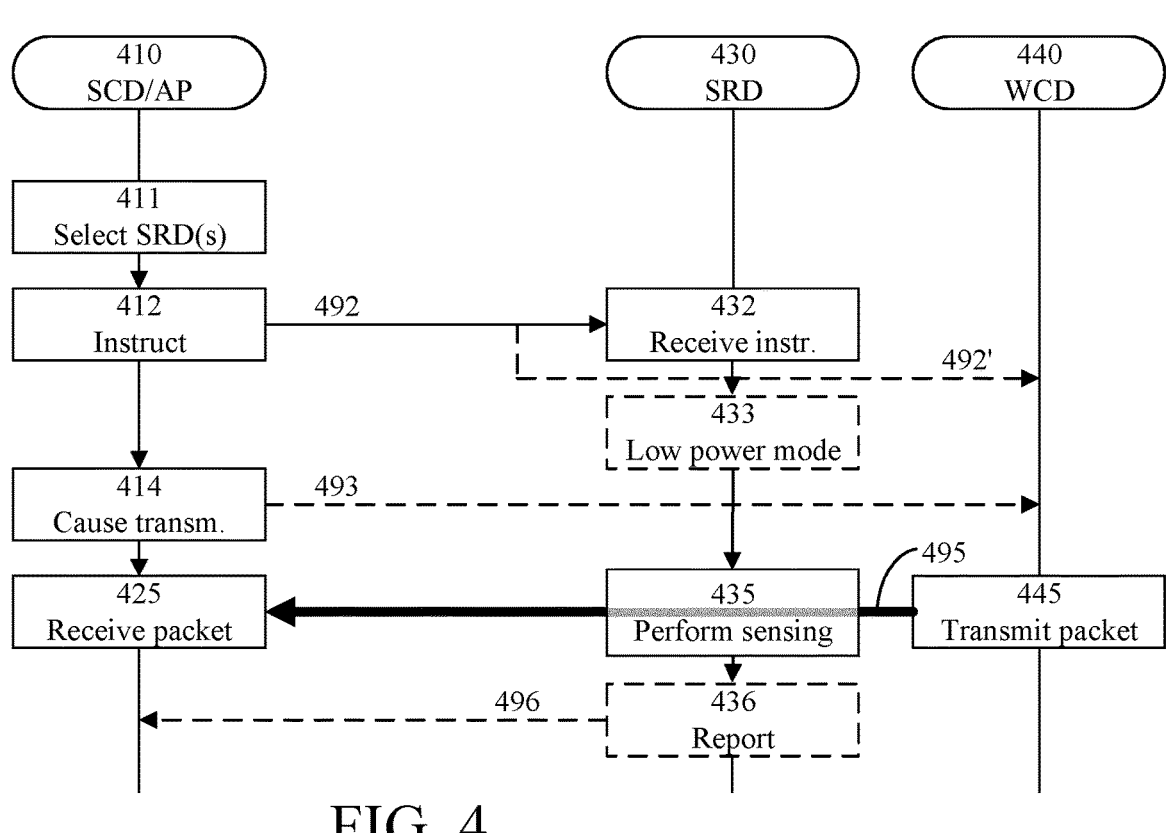
FIG. 4 is a combined flowchart and signaling diagram illustrating example method steps and signaling according to some embodiments.

FIG. 4 illustrates principles according to some embodiments, by example method steps and signaling relating to an access point (AP) 410 acting as a sensing coordination device (SCD), a sensing receiver device (SRD) 430, and a wireless communication device (WCD) 440. The example of FIG. 4 is for an uplink communication packet. In this example, the WCD 440 acts as sensing transmitter device.

The AP 410 is associated with one or more SRDs (including the SRD 430), and is configured for communication with one or more WCDs (including the WCD 440).

For example, the SCD may correspond to the SCD 190A of FIG. 1, the AP 410 may correspond to the AP 110 of FIG. 1, the SRD 430 may correspond to one or more of the STAs 111, 112, 113 of FIG. 1, and the WCD 440 may correspond to one or more of the STAs 111, 112, 113 of FIG. 1.

Generally, one device (e.g., a STA) can be configured to function as only a WCD, as only an SRD, or as a WCD and an SRD. However, when executing the principles of FIG. 4, the identity of at least one of the devices represented by the WCD 440 differs from the identities of the devices represented by the SRD 430.

In step 411, the AP 410 selects at least one SRD 430 in association with (e.g., for) a time interval. Any (one, some, or all) of the SRDs associated with the AP 410 may be selected in step 411, with the exception of any SRD also acting as sensing transmitter device in the time interval.

In step 412, the AP 410 instructs the selected SRD 430 to perform sensing measurements during the time interval. In FIG. 4, this is implemented by the AP 410 sending an instruction signal 492 to the SRD 430. The instruction to perform sensing measurements during the time interval is received by the SRD 430 in step 432.

The instruction signal 492 may comprise one sensing instruction message per time interval for sensing measurements, or may comprise a single instruction message indicative of a plurality of time intervals for sensing measurements (e.g., in the form of a time pattern).

In some embodiments, instructing the SRD 430 to perform sensing measurements may comprise transmitting an explicit sensing instruction message 492 to the selected sensing receiver devices before the time interval.

In some embodiments, instructing the SRD 430 to perform sensing measurements may comprise transmitting a scheduling grant 492 for the time interval to the at least one of the wireless communication devices, wherein the scheduling grant comprises an implicit sensing instruction message to the selected sensing receiver devices.

In some embodiments, instructing the SRD 430 to perform sensing measurements may comprise transmitting a request-to-send (RTS) 492 to the at least one of the wireless communication devices, wherein the RTS comprises an implicit sensing instruction message (e.g., via an element in the medium access control, MAC, header) to the selected sensing receiver devices.

In some embodiments, in response to receiving the instruction signal 492, the SRD 430 may operate in accordance with a low power mode until the time interval is reached, as illustrated by optional step 433, and/or between time intervals when a plurality of time intervals are indicated by the instruction signal 492.

In step 414, the AP 410 causes transmission, during the time interval, of a communication packet between the AP 410 and the WCD 440. The AP 410 causes the transmission by triggering the WCD 440 to execute step 445, wherein packet communication is performed by transmitting the communication packet 495 during the time interval to the AP 410, which receives the communication packet 495 in step 425. The triggering is illustrated in FIG. 4 by triggering signal 493. For example, the communication packet may be one or more of: a data packet, a control packet, a reporting packet, or a clear-to-send (CTS).

As exemplified in connection with FIG. 2, causing the transmission of the packet 495 may comprise one or more of: scheduling the WCD 440 for transmission during the time interval, transmitting an RTS for the WCD 440, and requesting reporting from the WCD 440.

In some embodiments, triggering the WCD 440 to perform the transmission of step 445 may be achieved by letting the instruction signal 492 for the SRD 430 also act as a triggering signal for the WCD 440 as illustrated by 492′.

During the time interval, the SRD 430 performs sensing measurements—as illustrated by step 435—on the communication packet 495 transmitted to the AP 410 from the WCD 440.

In some embodiments, the SRD 430 reports a result of the sensing measurements, as illustrated by optional step 436 (which may include generation and/or transmission of a report indicative of the result of the sensing measurements). In FIG. 4, the reporting is represented by the SRD 430 sending a report signal 496 indicative of the result of the sensing measurements to the AP 410.

It should be understood that features described in connection with FIG. 2 may be equally applicable to FIG. 4, even if not explicitly mentioned in connection thereto.

Generally, the sensing coordination device may select the sensing receiver device(s) and/or the wireless communication device(s) for a time interval based on locations of the devices in relation to a location of interest for sensing.

For example, if it is of interest to sense movement in a vicinity of STA 112 in FIG. 1, STA 112 may be instructed to perform sensing measurements more often than STAs 111 and 113 (e.g., STA 112 may be instructed to perform sensing measurements on all transmissions from AP 110, and from STAs 111 and 113). Alternatively or additionally, when STA 112 in FIG. 1 is instructed to perform sensing measurements, transmissions from STA 111 may be triggered if it is of interest to sense movement in a location between STAs 111 and 112.

If it is of interest to sense an entire environment (e.g., the room 100 of FIG. 1), the sensing coordination device may sweep all possible radio channels 101-106 over time (e.g., in a round robin fashion) by properly selecting sensing receiver devices and wireless communication devices in a plurality of time intervals.

Generally, it should be noted that one radio channel may be measured for sensing at a time or several radio channels may be measured for sensing simultaneously (by instructing several sensing receiver devices to perform sensing measurements at the same time). The latter can be achieved by instructing more than one SRD to perform sensing measurements simultaneously and/or by letting the communication packet relate to more than one WCD (e.g., using multi-user techniques).

With reference to IEEE 802.11, there has not been much difference between AP and STA up until IEEE 802.11n; in the sense of channel access and packet structure (e.g., each packet was sent from a single transmitter device and intended for a single receiver device). With IEEE 802.11ac, multi-user multiple-input multiple-output (MU-MIMO) transmission was introduced for the downlink (i.e., a downlink packet could be from the AP to two or more STAs). With IEEE 802.11ax, there is significant difference between AP and STA in terms of multi-user transmission. Specifically, IEEE 802.11ax supports orthogonal frequency division multiple access (OFDMA) in both downlink and uplink.

One example of applications according to some embodiments relates to scenarios where orthogonal frequency division multiplexing (OFDM) is used for multi-user (MU) downlink communication. Then, the communication packet is an OFDM packet (i.e., a packet transmitted using OFDM) that carries communication information intended for a plurality of the wireless communication devices associated with the access point. As is well known, preamble of a multi-user OFDM packet is typically common for the plurality of wireless communication devices and each wireless communication device of the plurality is associated with a respective frequency interval for the data part of the OFDM packet.

In this example, sensing measurements may be performed on the preamble to sense a composite channel associated with a combination of the frequency intervals. Alternatively or additionally, sensing measurements may be performed on one or more of the respective frequency intervals for the data part to sense one or more individual channels associated with corresponding ones of the frequency intervals.

For example, an OFDM packet may be transmitted by AP 110 of FIG. 1 carrying information intended for STA 111 in a first frequency interval and information intended for STA 112 in a second frequency interval. Then, STA 112 can be instructed to perform frequency selective sensing measurements of the radio channel 102 using the data part, and/or to perform sensing measurements of the frequency composite radio channel 102 using the preamble. Thus, in this example, the sensing receiver device performs sensing measurements on parts of the communication packet intended for another device as well as on parts of the communication packet intended for itself.

One example of applications according to some embodiments relates to scenarios where orthogonal frequency division multiplexing (OFDM) is used for multi-user (MU) uplink communication. Then, the communication packet is an OFDM packet (i.e., a packet transmitted using OFDM) that carries communication information from a plurality of the wireless communication devices associated with the access point. As is well known, preamble of a multi-user OFDM packet is typically common for the plurality of wireless communication devices and each wireless communication device of the plurality is associated with a respective frequency interval for the data part of the OFDM packet.

In this example, sensing measurements may be performed on the preamble to sense a composite channel associated with a combination of the frequency intervals. Alternatively or additionally, sensing measurements may be performed on one or more of the respective frequency intervals for the data part to sense one or more individual channels associated with corresponding ones of the frequency intervals.

For example, an OFDM packet may be transmitted to AP 110 of FIG. 1 carrying information from STA 111 in a first frequency interval and information from STA 112 in a second frequency interval. Then, STA 113 can be instructed to perform frequency selective sensing measurements using the data part, resulting in sensing knowledge of the both of the radio channels 105 and 106, and/or to perform sensing measurements using the preamble, resulting in sensing knowledge of the composite radio channel of 105 and 106. This enables efficient sensing of several channels using a single packet. In particular, when there are several wireless communication devices (possibly with quite different locations) as well as several sensing receiver devices active for a single OFDM packet, a large amount of channels may be sensed using the packet.

Figure 5:
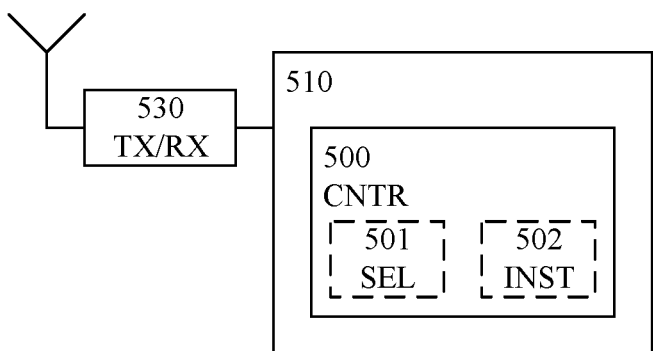
FIG. 5 is a schematic block diagram illustrating an example apparatus according to some embodiments.

FIG. 5 schematically illustrates an example apparatus according to some embodiments. The apparatus is for (e.g., comprised, or comprisable, in) a sensing coordination device 510 in association with a radio access node. The sensing coordination device 510 may, for example, correspond to any of: the SCD 190A comprised in the AP 110 of FIG. 1, the SCD 190B associated with the AP 110 of FIG. 1, the SCD 210 associated with the AP 220 of FIG. 2, the SCD comprised in the AP 310 of FIG. 3, and the SCD comprised in the AP 410 of FIG. 4. In some embodiments an AP or a control node comprising the sensing coordination device 510 may, in itself, be denoted as a sensing coordination device.

The apparatus of FIG. 5 comprises a controller (CNTR; e.g., controlling circuitry—such as a processor- or a control module) 500.

The controller 500 is configured to cause selection of at least one of the sensing receiver devices in association with a time interval (compare with 211, 311, 411). To this end, the controller 500 comprises, or is otherwise associated with (e.g., connected, or connectable, to) a selector (SEL; e.g., selecting circuitry or a selection module) 501. The selector 501 may be configured to select the sensing receiver device (s) in association with the time interval.

The controller 500 is also configured to cause instruction of the selected sensing receiver devices to perform sensing measurements during the time interval (compare with 212, 312, 412). To this end, the controller 500 comprises, or is otherwise associated with (e.g., connected, or connectable, to) an instructor (INST; e.g., instructing circuitry or an instruction module) 502. The instructor 502 may be configured to instruct the selected sensing receiver devices to perform sensing measurements during the time interval.

The controller 500 is also configured to cause transmission, during the time interval, of a communication packet between the radio access node and at least one of the wireless communication devices which differs from the selected at least one sensing receiver device (compare with 214, 314, 414). To this end, the controller 500 comprises, or is otherwise associated with (e.g., connected, or connectable, to) a transmitter (TX; e.g., transmitting circuitry or a transmission module), shown in FIG. 5 as part of a transceiver (TX/RX) 530. The transmitter may be configured to transmit the communication packet, or to trigger transmission of the communication packet as previously described.

Figure 6:
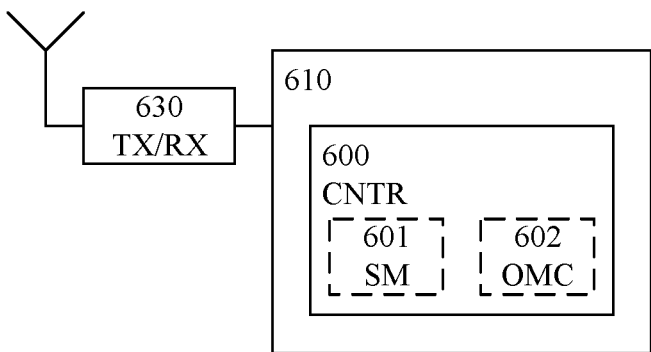
FIG. 6 is a schematic block diagram illustrating an example apparatus according to some embodiments.

FIG. 6 schematically illustrates an example apparatus according to some embodiments. The apparatus is for (e.g., comprised, or comprisable, in) a sensing receiver device 610. The sensing receiver device 610 may, for example, correspond to any of: a STA 111, 112, 113 of FIG. 1, the SRD 230 of FIG. 2, the SRD 330 of FIG. 3, and the SRD 430 of FIG. 4.

The apparatus of FIG. 6 comprises a controller (CNTR; e.g., controlling circuitry—such as a processor- or a control module) 600.

The controller 600 is configured to cause reception, from a sensing coordination device, of an instruction to perform sensing measurements during a time interval (compare with 232, 332, 423). To this end, the controller 600 comprises, or is otherwise associated with (e.g., connected, or connectable, to) a receiver (RX; e.g., receiving circuitry or a reception module), shown in FIG. 5 as part of a transceiver (TX/RX) 630. The receiver may be configured to receive the instruction to perform sensing measurements during the time interval.

The controller 600 is also configured to cause performance of sensing measurements, during the time interval, on a communication packet transmitted between the sensing coordination device and at least one wireless communication device which differs from the sensing receiver device and is associated with the sensing coordination device (compare with 235, 335, 435). To this end, the controller 600 comprises, or is otherwise associated with (e.g., connected, or connectable, to) a sensing measurer (SM; e.g., sensing measuring circuitry or a sensing measurement module) 601. The sensing measurer may be configured to perform the sensing on the communication packet.

The controller 600 may also be configured to cause operation of the sensing receiver device in accordance with a low power mode as previously described (compare with

233, 333, 433). To this end, the controller 500 comprises, or is otherwise associated with (e.g., connected, or connectable, to) an operational mode controller (OMC; e.g., operational mode controlling circuitry or an operational mode control module) 602. The operational mode controller may be configured to trigger the sensing receiver device to operate in accordance with a low power mode.

The controller 600 may also be configured to cause sending of a report indicative of a result of the sensing measurements (compare with 236, 336, 436). To this end, the controller 600 comprises, or is otherwise associated with (e.g., connected, or connectable, to) a transmitter (TX; e.g., transmitting circuitry or a transmission module), shown in FIG. 6 as part of the transceiver (TX/RX) 630. The transmitter may be configured to send the report as previously described.

As has been indicated previously, sending physical layer packets only intended for sensing measurements may be considered as wasteful, and it may be preferred if communication packets (e.g., data and/or control packets) that need to be sent anyway can be used for performing sensing measurements. This is achieved by some embodiments as already elaborated on.

Particular advantages are achieved by allowing sensing measurements to be performed on communication packets involving communication between other devices than the sensing receiver device.

Furthermore, the resource efficiency related to sensing may be increased if a packet can be used for sensing measurements by two or more sensing receiver devices. Then, sensing measurements in relation to two or more radio channels can be performed using a single packet. This is achieved by some embodiments as already elaborated on.

A few example implementations will now be elaborated on in relation to a set-up that largely resembles the IEEE 802.11 standard.

One purpose of sensing is to detect variations in the radio environment by comparing the channel characteristics at different instants of time. Typically, larger variations (i.e., more substantial channel changes) are easier to detect. To further illustrate this, consider the scenario illustrated in FIG. 1, but without STA 111 and 112. This scenario illustrates a room 100 with an AP 110 and a single STA 113. For example, the AP 110 may act as sensing transmitter device and the STA 113 may act as sensing receiver device. Although there will be propagation paths between the AP 110 and the STA 113 due to reflections (e.g., in the walls of the room), the signal components of such additional propagation paths can be expected to be much weaker than the signal component of the direct propagation path between the AP 110 and the STA 113 (e.g., around 20 dB weaker). Thus, when there is movement within the room, it can be expected that movements directly between the AP 110 and the STA 113 would be comparatively easily detected, whereas movements in other parts of the room may be harder to detect, or may not be detected at all.

This simple example illustrates one of the problems with sensing; namely how to be able to sense movements anywhere within an environment. Referring to the simple example above, it is easily realised that a straight-forward way to address the problem is by using more sensing receiver devices. This approach may be illustrated by introducing STAs 111, 112, as illustrated by FIG. 1, as sensing receiver devices. Then, the area where movement can occur without being detected is significantly decreased. However, it should be noted that—using only AP 110 as sensing transmitter device—the total area where movements cannot be detected is still significant.

One approach to address this is to use even more sensing receiving devices. However, a relatively large number of devices may be needed for proper sensing coverage, which may result in high installation cost and/or high maintenance cost. To reduce the number of STAs needed for proper sensing coverage, the approach above can be complemented (or replaced) by an approach where non-AP STA(s) are configured to act as sensing transmitter device and other STA(s) are configured to act as a sensing receiver devices. This approach is illustrated in FIG. 1 in terms of radio channels 104, 105, 106.

Now the example implementations will be elaborated on that may improve the sensing efficiency (e.g., in terms of the number of packets needed to be transmitted for sensing and/or in terms of the number of sensing receiver devices needed).

In some example implementations, one of the features supported by IEEE 802.11ax, namely OFDMA, is exploited.

In some example implementations, an "ordinary" communication (e.g., of a data packet or a control packet) is used also for sensing. To this end, the AP—in addition to transmitting or receiving the "ordinary" packet (termed herein as a communication packet)—requests one or more STAs to listen to the packet and use it for performing sensing measurements. At least one STA involved in the "ordinary" communication is not requested to use the packet for performing sensing measurements. This is referred to as third party sensing herein. In some embodiments, a STA requested to use the packet for performing sensing measurements is not involved in the "ordinary" communication (i.e., a device that is not involved in transmitting or receiving a communication packet uses the packet to perform sensing).

In a first example implementation, third party sensing is performed on downlink transmissions. Thus, the sensing receiver device uses a downlink packet (e.g., a packet carrying data or control information to another STA) for performing sensing measurements. Before the downlink packet is transmitted, the AP informs the (third party) sensing receiver device about the upcoming transmission to instruct it to perform sensing measurements. The information about the upcoming transmission may be explicit or implicit. Alternatively or additionally, the information about the upcoming transmission may be provided for each packet, or collectively for two or more packets.

In a second example implementation, third party sensing is performed on uplink transmissions. As explained previously, letting STAs act as sensing transmitter devices enables sensing coverage of different areas than when the AP acts as sensing transmitter device; due to that different propagation paths arise. Since an uplink transmission is typically preceded by an explicit grant to transmit an uplink packet, the packet carrying this explicit grant may also carry the information about the upcoming transmission to the (third party) sensing receiver device. For IEEE 802.11, the information about the upcoming transmission to the (third party) sensing receiver device may—alternatively or additionally—carried by a (possibly enhanced) trigger frame.

When the AP selects STAs that should use a specific uplink transmission for sensing measurements, it may use knowledge of location of the STA sending the uplink packet and/or knowledge of locations of the STAs available for performing sensing measurements and/or information of what area should be sensed.

Also within the scope of the second example implementation, the AP may perform uplink scheduling based (at least in part) on the sensing requirements. For example, if it is desirable to use the sensing to scan a room in a certain way, the uplink scheduling may be done such that the sensing requirements are fulfilled; using knowledge regarding which STA uplink transmissions enable sensing of which areas of the room. For example, the AP may schedule uplink transmissions for the STAs in a round robin fashion to enable the room to be scanned at regular intervals. If there is no uplink data to schedule from a STA, the AP may request or trigger the AP to send a packet anyway to enable sensing to be performed. For example, the AP may request that the STA sends a buffer status report in order to trigger an uplink transmission.

At some specific times, all STAs can be instructed to listen for uplink transmissions from all other STAs to establish a "coverage map". For example, the coverage map may be established at one or more of the following specific times: in a set-up phase, when a STA is added, when a STA is removed, when the location of a STA is changed, when inferior sensing performance is detected, and at regular time intervals (e.g., periodically). The coverage map can then be used to select which STAs to use as sensing receiver devices, which STAs to schedule for uplink transmissions; and when.

In a third example implementation, third party sensing is performed using OFDMA. When OFDMA is supported, e.g. in IEEE 802.11ax, further improvements are possible. Specifically, using OFDMA in the uplink, is possible to use several simultaneous sensing transmitter devices (e.g., up to nine simultaneous sensing transmitters are possible in a 20 MHz channel according to the IEEE 802.11ax standard). Thus, the AP may schedule several different STAs to transmit simultaneously in the uplink, and request one or more (possibly other) STAs to use the uplink transmissions for sensing measurements. Each STA transmitting in the uplink uses only a fraction of the bandwidth in the data portion of the packet, while the preamble is sent over the full bandwidth. Thus, a sensing receiver device may use the preamble for full bandwidth sensing measurements, which means that it will be able to detect changes in the composite channel from the transmitting STAs (i.e., a change in at least one of the channels from the transmitting STAs). Alternatively or additionally, a sensing receiver device may use the data portion for frequency selective sensing measurements for one or more of the individual channels from the transmitting STAs, which means that it will be able to detect changes in the channels individually.

Also within the scope of the third example implementation, the AP may perform uplink scheduling based (at least in part) on the sensing requirements. For example, if it is desirable to use the sensing to scan a room in a certain way, the uplink scheduling may be done such that the sensing requirements are fulfilled; using knowledge regarding which STA uplink transmissions enable sensing of which areas of the room. For example, the AP may schedule simultaneous uplink transmissions for STAs that are placed at very different locations to enable that the different propagation paths used for sensing measurements are likely to be substantially different.

Also within the scope of the third example implementation, the AP may—for the purpose of efficient sensing—decide to use OFDMA rather than scheduling STAs one at a time for uplink transmissions, even when the latter would be preferable in terms of communication requirements (e.g., resulting in lower power consumption at the transmitting STAs).

In a fourth example implementation, third party sensing is performed using multi-user frames. For example, IEEE 802.11ax supports multi-user channel protection through the mechanism of multiuser RTS (MU-RTS) and corresponding CTS. When an AP gains access to the medium (e.g., a 20 MHz channel) after completing a random backoff, the AP transmits a MU-RTS frame addressed to several STAs and occupying the full channel bandwidth. The addressed STAs that successfully receive the MU-RTS reply with a MU-CTS on the same channel. The MU-CTS transmissions from different STAs overlap in time and frequency. Referring to FIG. 1, the AP 110 could, for example, send a MU-RTS to STAs 111, 112, and instruct STA 113 to perform third party sensing measurements using the MU-CTS. An element could be added to the MAC header of the MU-RTS to instruct STA(s) to perform sensing measurements on the MU-CTS that follows the MU-RTS after a short inter frame spacing (SIFS) duration.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device (e.g., a station, STA, or user equipment, UE), a radio access node (e.g., an access point, AP, or a base station, BS), or a control node (e.g., a—possibly cloud-based—server node).

Embodiments may appear within an electronic apparatus (such as a wireless communication device, a radio access node, or a control node) comprising arrangements, circuitry, and/or logic according to any of the embodiments described herein. Alternatively or additionally, an electronic apparatus (such as a wireless communication device, a radio access node, or a control node) may be configured to perform methods according to any of the embodiments described herein.

Figure 7:
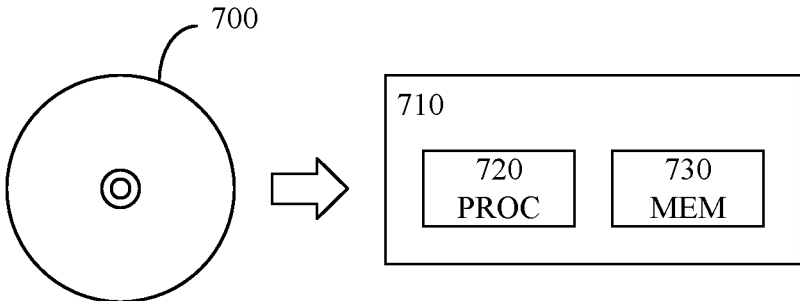
FIG. 7 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC; e.g., data processing circuitry or a data processing unit) 720, which may, for example, be comprised in an electronic apparatus (such as a wireless communication device, a radio access node, or a control node) 710. When loaded into the data processor, the computer program may be stored in a memory (MEM) 730 associated with or comprised in the data processor. According to some embodiments, the computer program may, when loaded into and run by the data processor, cause execution of method steps according to, for example, any of the methods illustrated in FIGS. 2-4 or otherwise described herein.

Figure 8:
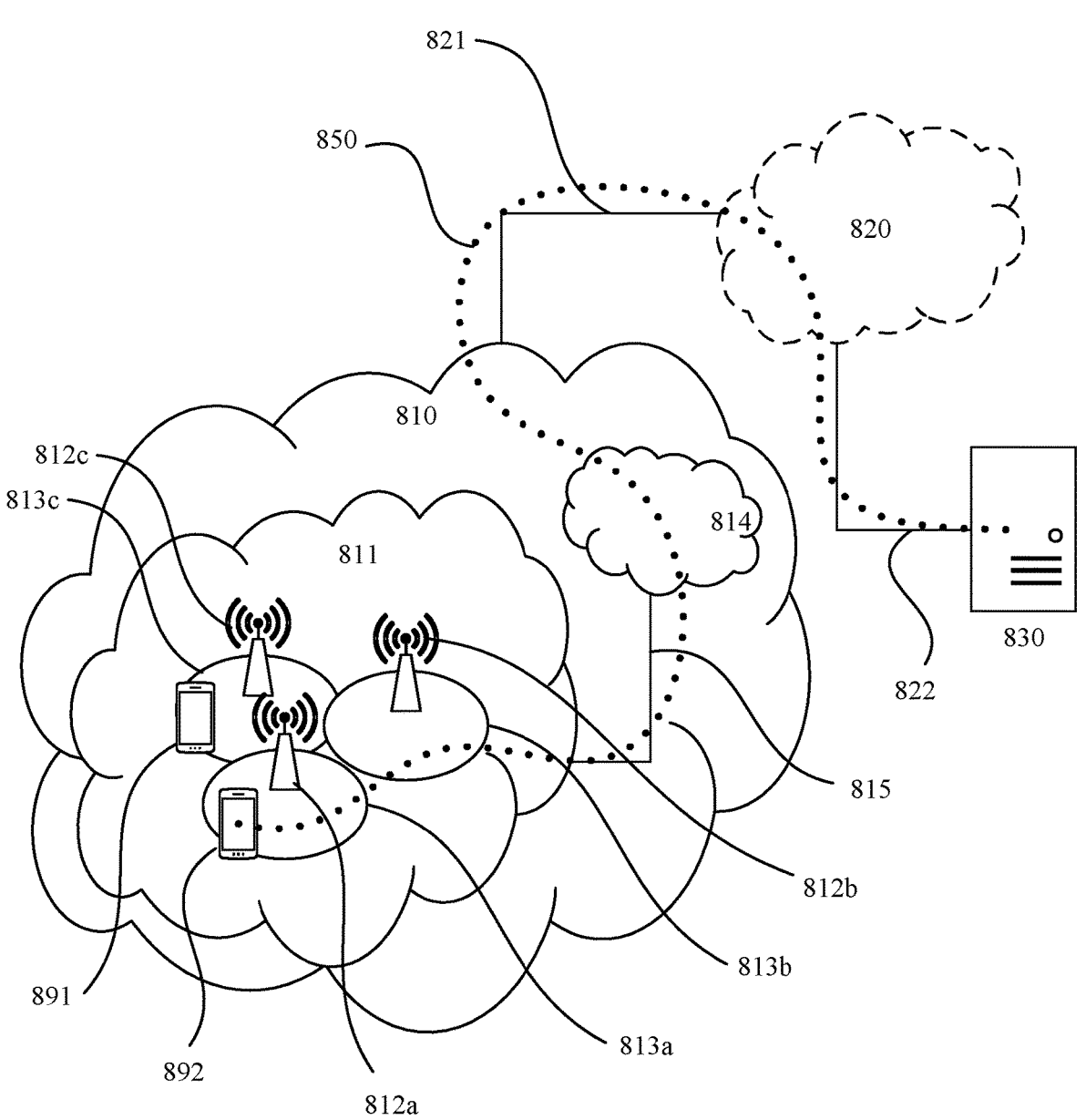
FIG. 8 illustrates a telecommunication network connected via an intermediate network to a host computer in accordance with some embodiments.

With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more subnetworks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

Figure 9:
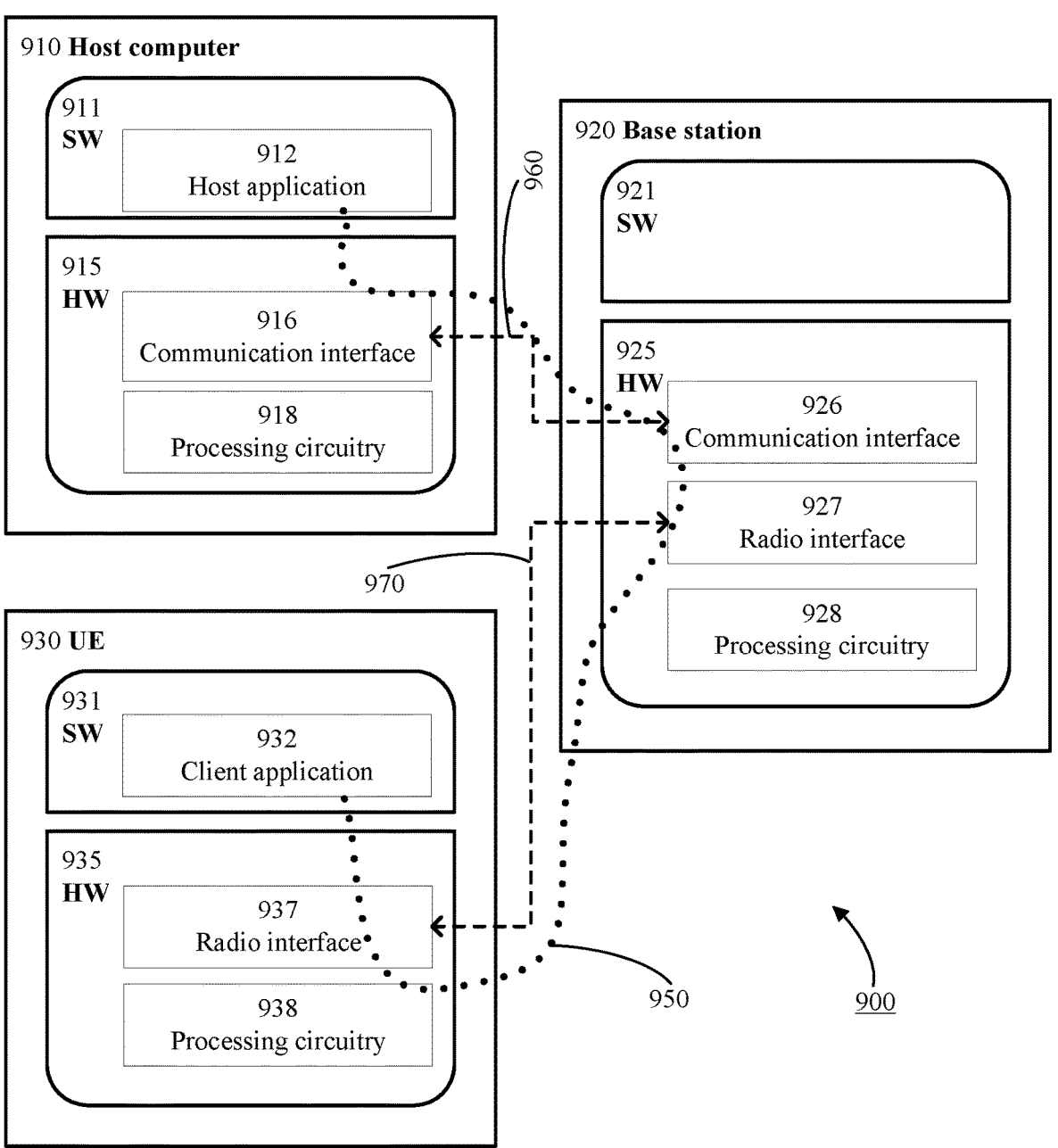
FIG. 9 illustrates a host computer communicating via a base station with a user equipment over a partially wireless connection in accordance with some embodiments.

It is noted that host computer 910, base station 920 and UE 930 illustrated in FIG. 9 may be similar or identical to host computer 830, one of base stations 812*a*, 812*b*, 812*c* and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may reduce the power consumption of sensing receiver(s) and/or the amount of overhead signaling for sensing. Thereby, benefits such as extended battery lifetime and/or increased efficiency of communication resource usage can be provided.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
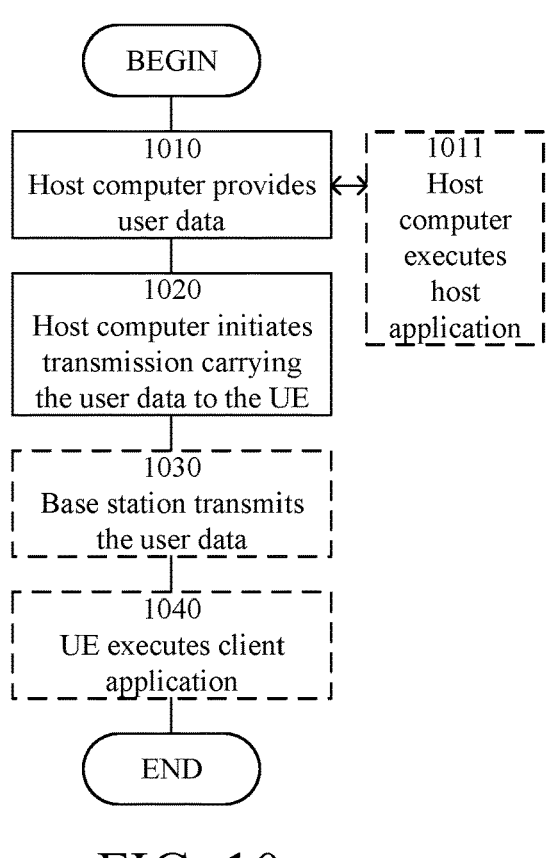
FIG. 10 is a flowchart illustrating example method steps implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
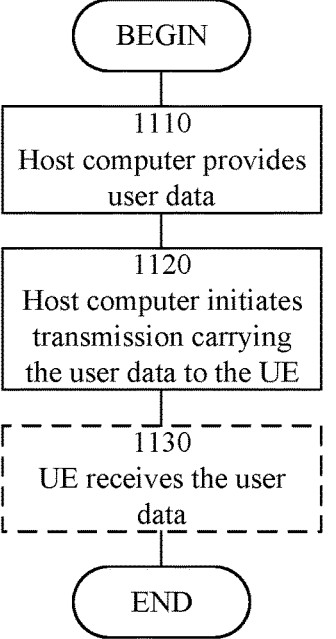
FIG. 11 is a flowchart illustrating example method steps implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
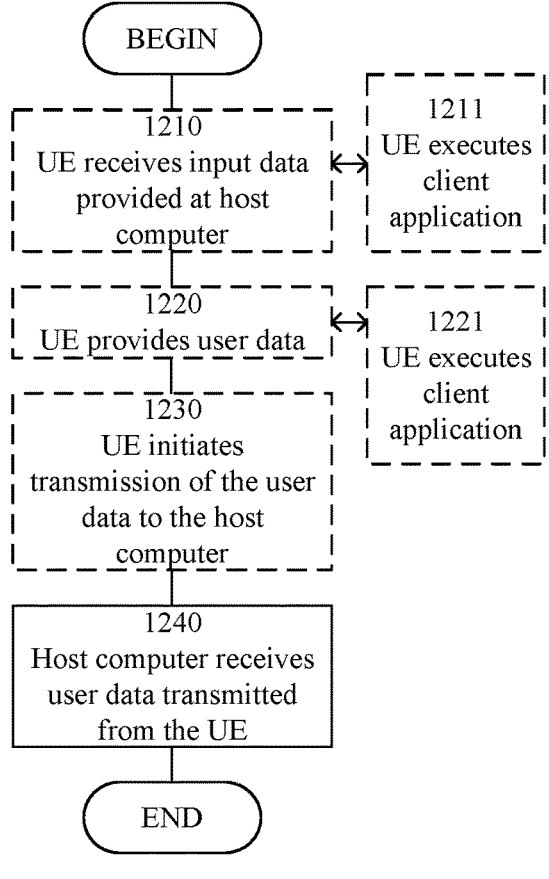
FIG. 12 is a flowchart illustrating example method steps implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
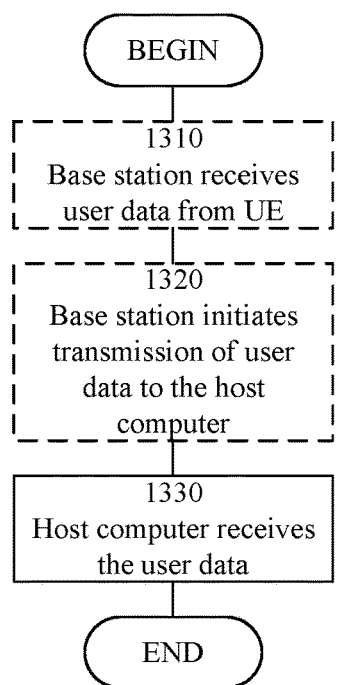
FIG. 13 is a flowchart illustrating example method steps implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group A Embodiments

A1. A method for sensing, performed by a wireless device operating as a sensing receiver device, the method comprising:

receiving, from a base station, an instruction to perform sensing measurements during a time interval; and performing sensing measurements, during the time interval, on a communication packet transmitted between the base station and at least one wireless communication device which differs from the sensing receiver device.

A2. The method of any of the previous embodiments in Group A, further comprising:

providing user data; and forwarding the user data to a host computer via the transmission to the base station.

Group B Embodiments

B1. A method for sensing, performed by a base station operating as a sensing coordination device, wherein the base station is associated with one or more sensing receiver devices and is configured for communication with one or more wireless communication devices, the method comprising:

selecting at least one of the sensing receiver devices in association with a time interval;

instructing the selected sensing receiver devices to perform sensing measurements during the time interval; and causing transmission, during the time interval, of a communication packet between the base station and at least one of the wireless communication devices which differs from the selected at least one sensing receiver device.

B2. The method of any of the previous embodiments in Group B, further comprising:

obtaining user data; and forwarding the user data to a host computer or a wireless device.

Group C Embodiments

C1. A wireless device for sensing, the wireless device comprising:

processing circuitry configured to perform any of the steps of any of the Group A embodiments; and power supply circuitry configured to supply power to the wireless device.

C2. A base station for sensing, the base station comprising:

processing circuitry configured to perform any of the steps of any of the Group B embodiments;

power supply circuitry configured to supply power to the base station.

C3. A user equipment (UE) for sensing, the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

Group D Embodiments

D1. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:

the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps described for the Group A embodiments.

D10. The communication system of embodiment D9, wherein the cellular network further includes a base station configured to communicate with the UE.

D11. The communication system of any of embodiments D9 through D10, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps described for the Group A embodiments.

D13. The method of embodiment D12, further comprising at the UE, receiving the user data from the base station.

D14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps described for the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:

the processing circuitry of the host computer is configured to execute a host application; and the UE's processing circuitry is configured to execute a client application associated with the host application, thereby providing the user data.

D18. The communication system of any of embodiments D14 through D17, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps described for the Group A embodiments.

D20. The method of embodiment D19, further comprising, at the UE, providing the user data to the base station.

D21. The method of any of embodiments D19 through D20, further comprising:

at the UE, executing a client application, thereby providing the user data to be transmitted; and at the host computer, executing a host application associated with the client application.

D22. The method of any of embodiments D19 through D21, further comprising:

at the UE, executing a client application; and at the UE, receiving input data to the client application, the input data being provided at the host computer by executing a host application associated with the client application, wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:

the processing circuitry of the host computer is configured to execute a host application;

the UE is configured to execute a client application associated with the host application, thereby providing the user data to be received by the host computer.

D28. A method implemented in a communication system including a host computer, a base station and a user equipment (UE), the method comprising:

at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:

at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

The invention claimed is:

1. A method for a sensing coordination device, wherein the sensing coordination device is associated with one or more sensing receiver devices and a radio access node configured for communication with one or more wireless communication devices, the method comprising:

selecting at least one of the sensing receiver devices in association with a time interval;

instructing the selected sensing receiver devices to perform sensing measurements during the time interval; and causing transmission, during the time interval, of a communication packet between the radio access node and at least one of the wireless communication devices which differs from the selected at least one sensing receiver device;

wherein the at least one of the wireless communication devices comprises a plurality of the wireless communication devices, and wherein the communication packet is an orthogonal frequency division multiplexing (OFDM) packet, a preamble of the OFDM packet being common for the plurality of wireless communication devices and each wireless communication device of the plurality being associated with a respective frequency interval for the data part of the OFDM packet.

2. The method of claim 1, wherein causing the transmission of the communication packet comprises:

transmitting the communication packet to the least one of the wireless communication devices during the time interval; or scheduling the at least one of the wireless communication devices for transmission during the time interval; or transmitting a request-to-send (RTS) for the at least one of the wireless communication devices; or requesting reporting from the at least one of the wireless communication devices.

3. The method of claim 1, wherein the communication packet is: a data packet, or a control packet, or a clear-to-send (CTS), or a reporting packet.

4. The method of claim 1, wherein instructing the selected sensing receiver devices to perform sensing measurements comprises:

transmitting an explicit sensing instruction message to the selected sensing receiver devices before the time interval; or transmitting a scheduling grant for the time interval to the at least one of the wireless communication devices, wherein the scheduling grant comprises an implicit sensing instruction message to the selected sensing receiver devices; or transmitting a request-to-send (RTS) for the at least one of the wireless communication devices, wherein the RTS comprises an implicit sensing instruction message to the selected sensing receiver devices.

5. The method of claim 4, wherein the explicit sensing instruction message is a single instruction message indicative of a plurality of time intervals for sensing measurements.

6. The method of claim 1, wherein instructing the selected sensing receiver devices to perform sensing measurements during the time interval further comprises indicating a frequency interval for the sensing measurements.

7. The method of claim 1, wherein selecting the at least one of the sensing receiver devices is based on locations of the sensing receiver devices in relation to a location of interest for sensing.

8. The method of claim 1, further comprising selecting the at least one of the wireless communication devices based on locations of the wireless communication devices in relation to a location of interest for sensing and in relation to locations of the selected sensing receiver devices.

9. A method for a sensing receiver device, the method comprising:

receiving, from a sensing coordination device, an instruction to perform sensing measurements during a time interval; and performing sensing measurements, during the time interval, on a communication packet transmitted between a radio access node and at least one wireless communication device which differs from the sensing receiver device;

wherein the at least one wireless communication device comprises a plurality of the wireless communication devices, and wherein the communication packet is an orthogonal frequency division multiplexing (OFDM) packet, a preamble of the OFDM packet being common for the plurality of wireless communication devices and each wireless communication device of the plurality being associated with a respective frequency interval for the data part of the OFDM packet.

10. The method of claim 9, wherein the communication packet is: a data packet, or a control packet, or a clear-to-send (CTS) or a reporting packet.

11. The method of claim 9, wherein the instruction to perform sensing measurements comprises:

an explicit sensing instruction message received before the time interval; or a scheduling grant for the time interval transmitted from the sensing coordination device to the at least one wireless communication device, wherein the scheduling grant comprises an implicit sensing instruction message to the sensing receiver device; or a request-to-send (RTS) transmitted from the sensing coordination device to the at least one wireless communication device, wherein the RTS comprises an implicit sensing instruction message to the sensing receiver device.

12. The method of claim 11, wherein the explicit sensing instruction message is a single instruction message indicative of a plurality of time intervals for sensing measurements, and wherein the method further comprises operating in accordance with a low power mode between time intervals of the plurality of time intervals.

13. The method of claim 9, wherein the instruction to perform sensing measurements during the time interval further comprises an indication of a frequency interval for the sensing measurements.

14. The method of claim 9, further comprising sending a report indicative of a result of the sensing measurements.

15. The method of claim 9, wherein sensing measurements are performed on the preamble to sense a composite channel associated with a combination of the frequency intervals and/or on one or more of the respective frequency intervals for the data part to sense one or more individual channels associated with corresponding ones of the frequency intervals.

16. A sensing coordination device configured for association with one or more sensing receiver devices and with a radio access node that is configured for communication with one or more wireless communication devices, the sensing coordination device comprising:

transceiver circuitry; and controlling circuitry operatively associated with the transceiver circuitry and configured to cause:

selection of at least one of the sensing receiver devices in association with a time interval;

instruction of the selected sensing receiver devices to perform sensing measurements during the time interval; and transmission, during the time interval, of a communication packet between the radio access node and at least one of the wireless communication devices which differs from the selected at least one sensing receiver device;

wherein the at least one of the wireless communication devices comprises a plurality of the wireless communication devices, and wherein the communication packet is an orthogonal frequency division multiplexing (OFDM) packet, a preamble of the OFDM packet being common for the plurality of wireless communication devices and each wireless communication device of the plurality being associated with a respective frequency interval for the data part of the OFDM packet.

17. The apparatus of claim 16, wherein the controlling circuitry causes the transmission of the communication packet based on being configured to cause an access point to:

transmit the communication packet to the least one of the wireless communication devices during the time interval; or schedule of the at least one of the wireless communication devices for transmission during the time interval; or transmit a request-to-send (RTS) for the at least one of the wireless communication devices; or request reporting from the at least one of the wireless communication devices.

18. A sensing receiver device comprising:

transceiver circuitry; and controlling circuitry operatively associated with the transceiver circuitry and configured to cause:

reception, from a sensing coordination device, of an instruction to perform sensing measurements during a time interval; and performance of sensing measurements, during the time interval, on a communication packet transmitted between the sensing coordination device and at least one wireless communication device which differs from the sensing receiver device and is associated with the sensing coordination device;

wherein the at least one wireless communication device comprises a plurality of the wireless communication devices, and wherein the communication packet is an orthogonal frequency division multiplexing (OFDM) packet, a preamble of the OFDM packet being common for the plurality of wireless communication devices and each wireless communication device of the plurality being associated with a respective frequency interval for the data part of the OFDM packet.

19. A method for a sensing coordination device, wherein the sensing coordination device is associated with one or more sensing receiver devices and a radio access node configured for communication with one or more wireless communication devices, the method comprising:

selecting at least one of the sensing receiver devices in association with a time interval;

instructing the selected sensing receiver devices to perform sensing measurements during the time interval; and causing transmission, during the time interval, of a communication packet between the radio access node and at least one of the wireless communication devices which differs from the selected at least one sensing receiver device;

wherein instructing the selected sensing receiver devices to perform sensing measurements comprises:

transmitting an explicit sensing instruction message to the selected sensing receiver devices before the time interval; or transmitting a scheduling grant for the time interval to the at least one of the wireless communication devices, wherein the scheduling grant comprises an implicit sensing instruction message to the selected sensing receiver devices; or transmitting a request-to-send (RTS) for the at least one of the wireless communication devices, wherein the RTS comprises an implicit sensing instruction message to the selected sensing receiver devices; and wherein the explicit sensing instruction message is a single instruction message indicative of a plurality of time intervals for sensing measurements.

20. A method for a sensing receiver device, the method comprising:

receiving, from a sensing coordination device, an instruction to perform sensing measurements during a time interval; and performing sensing measurements, during the time interval, on a communication packet transmitted between a radio access node and at least one wireless communication device which differs from the sensing receiver device;

wherein the instruction to perform sensing measurements comprises:

an explicit sensing instruction message received before the time interval; or a scheduling grant for the time interval transmitted from the sensing coordination device to the at least one wireless communication device, wherein the scheduling grant comprises an implicit sensing instruction message to the sensing receiver device; or a request-to-send (RTS) transmitted from the sensing coordination device to the at least one wireless communication device, wherein the RTS comprises an implicit sensing instruction message to the sensing receiver device; and wherein the explicit sensing instruction message is a single instruction message indicative of a plurality of time intervals for sensing measurements, and wherein the method further comprises operating in accordance with a low power mode between time intervals of the plurality of time intervals.

* * * * *